March 14, 1950 H. L. BOWERS 2,500,512
WING LIFT MODIFICATION MEANS
Filed March 8, 1947
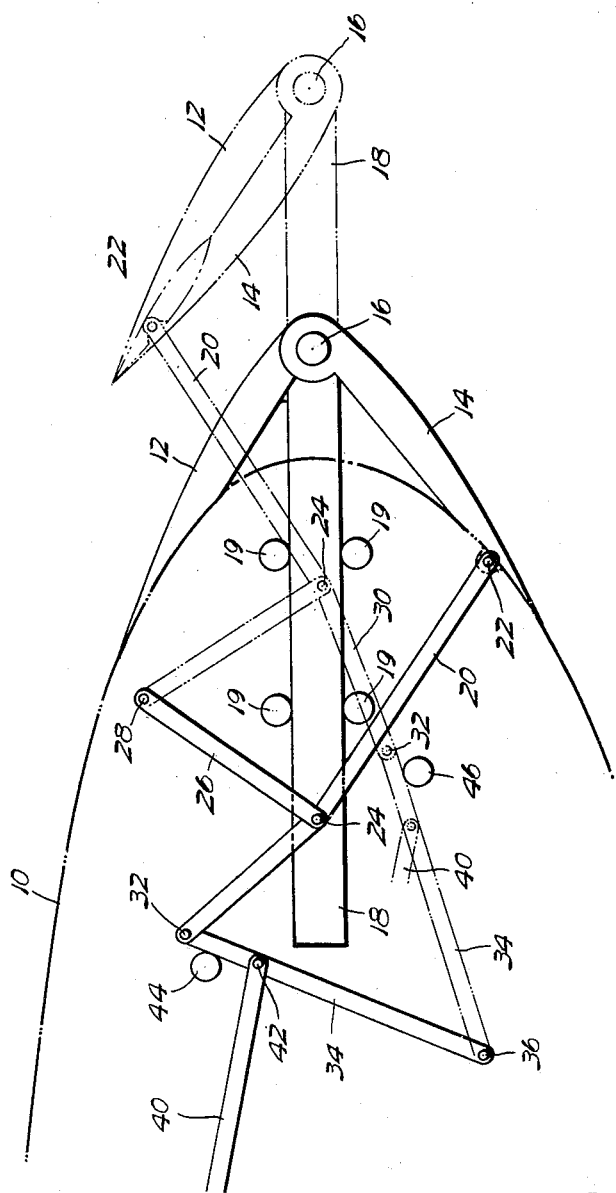
INVENTOR
HERBERT L. BOWERS
BY
Bean, Brooks, Buckley & Bean.
ATTORNEYS Patented Mar. 14, 1950

2,500,512

UNITED STATES PATENT OFFICE 2,500,512

WING LIFT MODIFICATION MEANS

Herbert L. Bowers, Clarence, N. Y., assignor to Bell Aircraft Corporation, Wheatfield, N. Y.

Application March 8, 1947, Serial No. 733,376

6 Claims. (Cl. 244—42)

This invention relates to aircraft, and more particularly to lift modifying devices for high speed airplane wings and the like.

It is an object of the invention to provide an improved wing lift control device of the leading edge slat or slot type. Another object of the invention is to provide an improved retractable slat device for the above stated purpose. Another object of the invention is to provide an improved wing leading edge retractable slat unit which comprises a structural unit of utmost simplicity providing optimum aerodynamic characteristics under low speed slot-open condition, as well as optimum aerodynamic characteristics for high speed flight purposes under slot-closed conditions.

Other objects and advantages of the invention will appear in the specification hereinafter.

The invention is illustrated in the drawing wherein Fig. 1 is a fragmentary chordwise section through a wing leading edge portion and slat device of the invention, schematically showing a slat actuating mechanism therefor in slot-closed and slot-open positions.

The invention is illustrated in conjunction with a wing leading edge portion designated 10; the slat device comprising a pair of flaps 12—14 which are pivotally interconnected by a connection device 16 carried at the forward ends of a plurality of struts 18 which are mounted upon roller or slide devices 19 to extend in directions generally chordwise of the wing while being spaced at intervals spanwise of the wing panel.

The flaps 12—14 are sectionally shaped and arranged so as to be adapted to lie in juxtaposition as illustrated by the broken line showing thereof at the right hand portion of the drawing, when the strut devices 18 are projected forwardly of the wing so as to dispose the slat unit in spaced relation ahead of the wing nose. The outer surfaces of the flaps 12—14 are curved in sectional profile so that when the flaps are disposed in side-by-side relation as shown by broken lines at the right hand side of the drawing they cooperate to provide in combination with the wing nose a leading edge slot of optimum form. The flaps 12—14 are also so dimensioned and proportioned sectionally so as to be adapted to be pivoted to a slot-closed condition and disposed with the trailing edges of the flaps contacting adjacent portions of the wing leading edge contour in tangential relation (as shown in solid lines in the drawing) whereby to provide in effect a single unslotted wing unit having a so-called sharp leading edge form such as is particularly adapted for supersonic or high speed rates of flight. It will be understood that the flap devices 12—14 may be so shaped in sectional profile as to provide any desired unsymmetrical overall wing sectional profile form, although in the case of the drawing the flap devices are illustrated to be so shaped and arranged as to provide a sharp edged symmetrical sectional profile wing form when the slat is in its closed position, such as is particularly suited for high speed performance.

As stated before, the flaps 12—14 are pivotally connected at their leading edges as by means of hinge pins at 16 to racks or strut devices as indicated at 18; the latter being mounted upon the main wing structure so as to be extensible-retractable relative to the wing; and it is to be understood that any suitable power supply means may be connected to the racks 18 for actuation thereof between the solid line and broken line positions thereof as illustrated in the drawing. Such rack motivating mechanism will of course be arranged to be controlled by the aircraft personnel, as will be readily understood by anyone versed in the aeronautical arts. To control the attitudes of the flaps 12—14 relative to their pivot connections 16 any suitable link or lever system may be employed. For example, in the drawing, the upper flap 12 is indicated to be rigidly mounted relative to the racks 18 so as to extend in cantilever relation therefrom at such an attitude as to be adapted to engage tangentially against the upper surface portion of the nose of the wing when the slat is in slot-closed position as shown in solid lines on the drawing, and to extend at proper oblique attitude when the slat device is displaced to its slot-open position, as illustrated in broken lines on the drawing. The lower flap 14 is equipped with one or more control link systems at intervals spanwise of the wing as typified by the push-pull strut 20 which is pivotally connected at 22 adjacent the trailing edge of the flap 14. Intermediately of its ends the strut 20 pivotally connects at 24 to one end of a rocker arm 26 which is pivotally connected at 28 to the structure of the wing 10. The strut 20 at its other end pivotally connects at 32 to one end of a lever 34, the other end of which is pivotally connected at 36 to the aircraft wing structure. A pilot-operable or automatically actuated push-pull control member 40 pivotally connects at 42 to the lever 34 for rocking the latter about its pivot connection 36. Stop devices 44 and 46 are carried by the aircraft wing structure for limiting the pivotal movements of the lever 34, and the flap actuating link members are so dimensioned and arranged that pilot actuations of the rack 18 through manual operations of the control member 40 are regulated so as to provide a flap actuating system wherein the flap 14 is pivoted from its position as shown in solid lines when the rack 18 is retracted relative to the wing into an upwardly directed position in side-by-side relation against the upper flap 12 as shown in broken lines in the drawing when the rack 18 is in its extended position.

Thus, it will be understood that when the flap unit is in its solid line retracted position it cooperates with the main wing structure to provide in effect a solid wing structure having a sharp leading edge form for optimum aerodynamic characteristics under high speed flight conditions, and that when the flap unit is pilot actuated to its forwardly projected position as shown in broken lines in the drawing, the flap unit has automatically closed upon itself to provide an ideally contoured slat disposed ahead of the leading edge of the wing at an oblique attitude so as to provide an open air slot of optimum aerodynamic shape between the flap unit and the wing. When the flap unit is so disposed in open slot condition ahead of the wing leading edge the relatively blunt nose portion of the main wing structure is thereby exposed to provide the leading edge portion of the wing, and thus it will be appreciated that the open slot arrangement of the flap-wing unit is of ideal form for maximum lift under relatively slow speed flight conditions. Therefore, the invention provides by means of a most simple mechanism an ideal sharp leading edge wing unit under high speed flight conditions and a blunt nose open slot arrangement for maximum lift purposes when landing or flight at relatively slow speeds.

Thus, it will be appreciated that the invention provides an improved wing slot mechanism for high speed aircraft, especially aircraft designed to operate at supersonic speed ranges and also to land or fly at relatively low speeds; and that although only one form of the invention has been shown and described in detail it will be apparent to those skilled in the art that the invention is not so limited but that various changes may be made therein without departing from the spirit of the invention or the scope of the appended claims.

I claim:

1. In an aircraft, in combination, an aircraft wing having a substantially symmetrical and relatively blunt shaped leading edge section, strut means movably mounted to extend from said wing in extensible-retractable relation thereon, a split slat unit comprising a pair of complementing slats connected at their leading edges to said strut means, one of said slats being disposed to extend from its leading edge obliquely rearwardly and upwardly to contact in tangential relation at its trailing edge portion the skin surface of said wing when said strut means is in retracted condition and to be disposed ahead of said wing surface when said strut means is in extended position to provide an air slot between said wing and said slat, the other of said slats being pivotally connected to said strut means, and control means connected to said pivoted slat for automatically actuating said pivoted slat to lie in side-by-side relation with said first slat when said strut means is in extended position and to control said pivoted slat to swing to clear said wing leading edge and to move to contact at its trailing edge in tangential relation with the leading edge surface of said wing when said strut means is in retracted position, whereby to provide a sectionally symmetrical non-slotted relatively sharp leading edge supplement to said wing.

2. In an aircraft, in combination, an aircraft wing having a sectionally symmetrical relatively blunt shaped leading edge, mounting means movable on said wing in extensible-retractable relation thereon, the permissible movement of said mounting means being generally chordwise of said wing and consisting essentially of pure translation, a split slat unit comprising a pair of complementing slats connected at their leading edges to said mounting means, one of said slats being non-rotatably carried by said mounting means and disposed to extend from its leading edge obliquely rearwardly and upwardly to contact in tangential relation at its trailing edge portion the upper skin surface of said wing rearwardly of said leading edge when said mounting means is in retracted condition and to be disposed ahead of said wing surface when said mounting means is in extended position to provide an air slot between said wing and said slat, the other of said slats being pivotally connected to said mounting means, and control means connected to said pivoted slat for automatically actuating said pivoted slat to lie in side-by-side relation with said first slat when said mounting means is in extended position and to control said pivoted slat to swing to slat unit open position and to clear said wing leading edge and to contact at its trailing edge in tangential relation with the lower skin surface of said wing rearwardly of said leading edge when said mounting means is in retracted position, whereby to provide a sectionally symmetrical relatively sharp leading edge supplement to said wing.

3. In an aircraft, in combination, an aerodynamic surface having a sectionally symmetrical relatively blunt shaped leading edge, mounting means extending from said surface in chordwise extensible-retractable relation thereon, a split slat unit comprising a pair of complementing slats connected at their leading edges to said mounting means, one of said slats being non-rotatably mounted for essentially chordwise movement only and disposed to extend from its leading edge obliquely rearwardly to contact in tangential relation at its trailing edge portion the skin of one side of the nose of said surface rearwardly of said leading edge when said mounting means is in retracted condition and to be disposed ahead of said surface nose when said mounting means is in extended position to provide an air slot between said surface and said slat, the other of said slats being pivotally connected to said mounting means, and control means connected to said pivoted slat for automatically actuating said pivoted slat to lie in side-by-side relation with said first slat when said mounting means is in extended position and to control said pivoted slat to swing to slat unit open position and to clear said wing leading edge and to contact at its trailing edge in tangential relation with the skin of the other side of said nose of said surface rearwardly of said leading edge when said mounting means is in retracted position, whereby to provide a sectionally symmetrical relatively sharp leading edge supplement for said surface.

4. In an aircraft, in combination, an aerodynamic surface having a sectionally symmetrical relatively blunt shaped leading edge, mounting means movable on said surface, the permissible movement of said mounting means being generally chordwise of said surface and consisting essentially of pure translation, a split slat unit comprising a pair of complementing slats connected at their leading edges to said mounting means, one of said slats being carried non-rotatably by said mounting means and disposed to extend from its leading edge obliquely rearwardly to contact in tangential relation at its trailing edge portion the skin of one side of said surface rearwardly of said leading edge in a first position of said mounting means and to be disposed ahead of said surface when said mounting means is in a second position to provide an air slot between said surface and said slat, the other of said slats being connected to control means for actuation of said slat to lie in side-by-side relation with said first slat when said mounting means is in said second position and to control said other slat to swing to slat unit open position and to clear said surface leading edge and to contact at its trailing edge in tangential relation with the skin of the other side of said surface rearwardly of said leading edge when said mounting means is in said first position, whereby to provide a sectionally symmetrical relatively sharp leading edge supplement for said surface.

5. In an aircraft, in combination, an aircraft wing having a substantially symmetrical and relatively blunt shaped leading nose portion, a split slat unit comprising an upper slat and a complementing lower slat, support means movably mounted upon said wing to be displaceable thereon in directions chordwise thereof, said upper slat being non-rotatably fixed to said support means for translational movements therewith and said lower slat being pivotally connected at its leading edge to said support means and thereby mounted on said wing to be chordwise displaceable thereon between extended and retracted positions, said upper slat being disposed to extend from its leading edge obliquely rearwardly and upwardly into tangential contact with the upper skin surface of said wing nose portion rearwardly of the leading edge of said wing when said unit is in retracted condition and to be spaced ahead of said wing nose surface when said unit is in extended position to provide an air slot between said wing and said upper slat, and control means connected to said lower slat and arranged to automatically move said slat unit chordwise of said wing between said extended and retracted positions, and to rotate said lower slat in such timed relation to said chordwise movement that said lower slat clears the leading edge of said wing as said lower slat is moved between extended position side-by-side with said upper slat and retracted position tangent to the lower side of the nose of said wing, whereby to provide a sectionally symmetrical relatively sharp leading edge supplement to said wing when said slat unit is in retracted position.

6. In an aircraft, in combination, an aerodynamic surface having a substantially symmetrical and relatively blunt shaped leading nose portion, a split slat unit comprising a first slat and a complementing second slat, support means movably mounted upon said surface to be displaceable thereon in directions chordwise thereof, said first slat being non-rotatably fixed to said support means and said second slat being pivotally connected at its leading edge to said support means and thereby mounted on said surface to be chordwise displaceable thereon between extended and retracted positions, said first slat being disposed to extend from its leading edge obliquely rearwardly into tangential contact with one side of said surface nose portion rearwardly of the leading edge of said surface when said unit is in retracted condition and to be spaced ahead of said surface nose when said unit is in extended position to provide an air slot between said surface and said first slat, and control means connected to said second slat and arranged to automatically move said slat unit chordwise of said surface between said extended and retracted positions, and to rotate said second slat in such timed relation to said chordwise movement that said second slat clears the leading edge of said surface as said second slat is moved between extended position side-by-side with said first slat and retracted position tangent to the second side of the nose of said wing, whereby to provide a sectionally symmetrical relatively sharp leading edge supplement to said surface when said slat unit is in retracted position.

HERBERT L. BOWERS.

REFERENCES CITED

The following references are of record in the file of this patent:

UNITED STATES PATENTS

| Number | Name | Date |
|---|---|---|
| 1,472,199 | Thomson | Oct. 30, 1923 |
| 2,321,837 | Maxwell | June 15, 1943 |